March 24, 1931.    V. VALLETTA    1,797,811

SERVO BRAKE FOR MOTOR VEHICLES

Filed April 19, 1929    2 Sheets-Sheet 1

March 24, 1931.  V. VALLETTA  1,797,811
SERVO BRAKE FOR MOTOR VEHICLES
Filed April 19, 1929   2 Sheets-Sheet 2
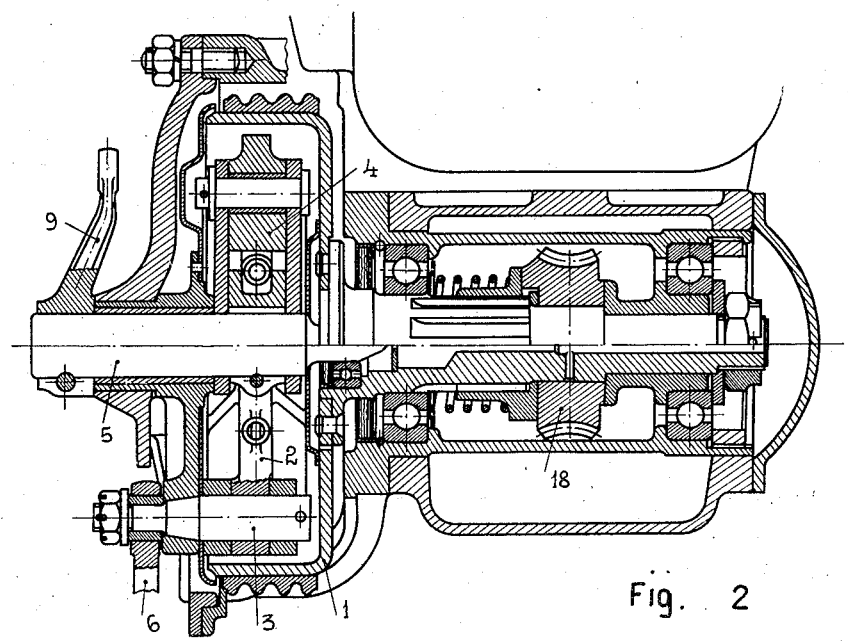
Fig. 2
Fig. 3
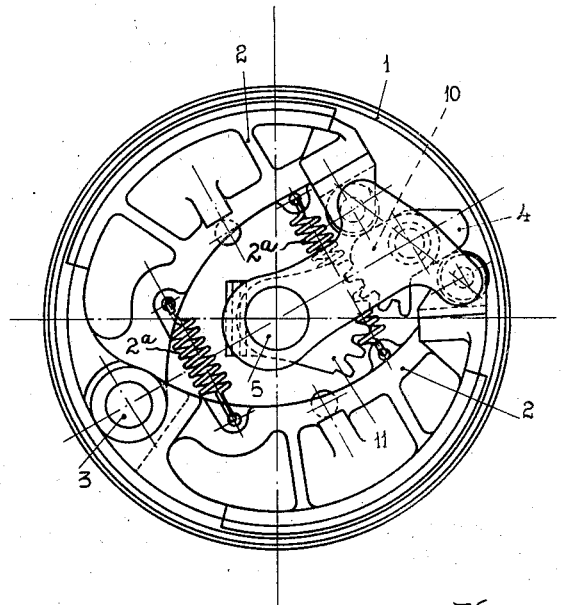
Inventor,
Vittorio Valletta.
By Henry Ortlip
atty.

Patented Mar. 24, 1931

1,797,811

UNITED STATES PATENT OFFICE

VITTORIO VALLETTA, OF TURIN, ITALY, ASSIGNOR TO FIAT SOCIETÀ ANONIMA, OF TURIN, ITALY

SERVO-BRAKE FOR MOTOR VEHICLES

Application filed April 19, 1929, Serial No. 356,420, and in Italy October 31, 1928.

This invention relates to a device for operating vehicle brakes, more particularly motor vehicle brakes, by means of a servo-brake and is more particularly intended to make the driver operating the servo-brake either by hand or foot aware of the effect obtained enabling him to graduate said braking action.

When the vehicle is braked by the engine either directly or indirectly, or by the transmission gear, or in any way by a force other than that of the person producing the braking action, the work to be effected by this person is limited to the connection, by means of a foot or hand lever, of the servo-brake with the brakes. From the moment when the servo-brake comes into action, the driver no longer feels under his foot or hand a resistance proportionate to the braking effect as in the usual direct braking. As the servo-brake does not offer any resistance against its operation, the person acting thereon by hand or foot is not certain of its operation and instinctively goes on pressing the pedal or pulling the lever until the end of the stroke. It is clear that this may cause against the driver's will too sudden braking actions which are all the more dangerous as they are more unexpected to the driver himself. In order to obviate this serious drawback an artificial resistance is often provided for, for instance by means of a spring; it is however clear that said artificial resistance is independent of the action of the servo-brake and may cause more serious disadvantages, e. g. it may give the impression of braking even when the servo-brake is damaged and does not work and the driver will become aware of this far too late for setting the ordinary brakes into operation.

The object of this invention is to provide a device which causes through the braking action of the servo-brake a gradual reaction proportional to the braking effect under the driver's foot or hand. The driver receives therefore the same impression as when he actuates the ordinary brakes and therefore presses his foot or pulls the hand lever more or less strongly according to the desired effect.

Moreover the devices for operating the servo-brake and the ordinary brakes are connected together so that they come into action simultaneously, while the direct brake operating mechanism is normally actuated when the pedal or lever reach the end of their stroke, i. e. only when the driver has become aware that the servo-brake does not work, which may be too late. According to this invention the brakes may be actuated by the ordinary operating mechanism before they are actuated by the servo-brake operating mechanism, independently of the fact whether this latter works or not; the driver will feel the reaction of one operating mechanism or the other and rely thereupon in time.

In the accompanying drawings—

Figs. 2 and 3 are an axial section and an end view respectively of a constructional form of a servo-brake.

Figure 1:
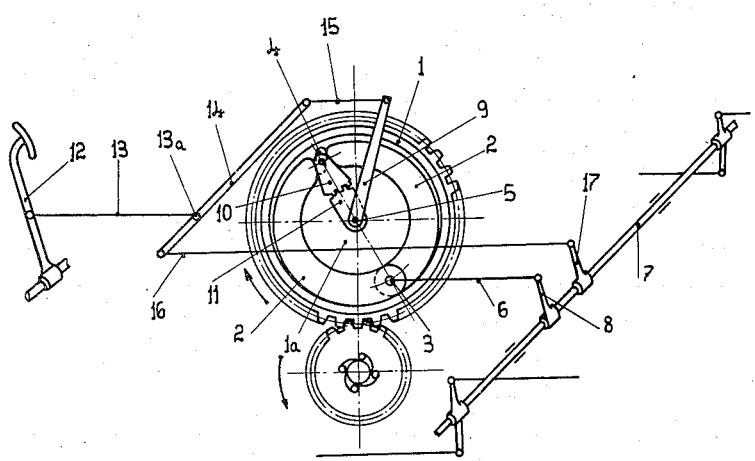
Figure 1 is a diagrammatic view of a device embodying the invention.
Figure 1:

The servo-brake is of the mechanical type with friction operating mechanism; the driving member is connected to the transmission gear of the vehicle and actuated by the inertia of the running vehicle.

In the example shown in the drawing, 1 is a drum rotated in the direction of the arrow by the transmission gear of the vehicle (not shown) through a worm wheel 18 (Fig. 2) and forming the friction disc of an expanding shoe brake, of which the brake shoes 2 are hinged on the same pivot 3 and actuated by a cam 4. The pivot 3 and cam 4 are carried by a suporting disc 1a, rotating on the same axis 5 as the drum 1. Said disc 1a is connected by a push rod 6 to the brake rod 7, the push-rod 6 being hinged on one side to the pivot 3 or to a separate pivot, which is the same for the working of the device, and on the other side to the lever 8 keyed to the brake rod 7.

The cam 4 is rotated by a lever 9 directly by means of toothed sectors 10 and 11 as illustrated, one of which is fast to the cam, the other being connected to the lever oscillating on the axis 5 of the drum and disc; return springs 2a (Fig. 2) connect the brake shoes 2 together. The pedal 12 operates the lever 9 through a push-rod 13 and a swing lever 14 which is connected on one side to the lever 9 by means of the rod 15 said lever 14 being connected on the other side to the brake rod 7 by means of the push-rod 16 and lever 17 which is keyed to the brake rod.

The device works as follows:

In order to brake the vehicle, the driver presses the pedal 12 and thereby pulls the rods 15 and 16. This latter directly actuates the brakes connected to the rod 7 and the rod 15 brings the brake shoes 2 against the drum 1. The action of the servo-brake is exerted by friction of the brake shoes 2 on the drum which tends to carry along in rotation the pivot 3 thereby pulling the rod 6 and actuating the brakes of the rod 7. The drum 1 will also carry along in rotation the cam 4 and therefore the lever 9.

As the action of the servo-brake is stronger than that of the driver's foot or hand, it will prevail on this latter and the initial resistance of the lever 9 against rotation, under the action of the usual return springs 2a of the brake shoes overcome by the foot pressure on the pedal 12, is transformed into a force which opposes the action of the foot as soon as friction takes place between the brakes 2 and drum 1.

If, for any reason, e. g. skidding through accidental lubrication of the drum 1, the servo-brake does not work, the front end of the rod 15 becomes the fulcrum of the swing lever 14 and the brakes are actuated automatically by the ordinary brake operating mechanism through the rod 16.

The driver is in any case aware of a resistance under his foot, which is proportional to the actual braking effect obtained.

As soon as the pedal stroke begins it applies the brakes by the action of the two rods 15 and 16, the action of the former prevailing if the servo-brake regularly comes into action and the action of the latter prevailing if the servo-brake does not function.

A feature of this invention is that the ratio between the operating levers (arms of the swing lever 14, lever 9, radius of the pivot 3 with respect to the axis 5, levers 8 and 17) is such that the hinge point 13a of the rod 13 on the swing lever 14 is always balanced, i. e. its position is unaffected by the rotation of the disc 1a.

If the servo-brake does not function, owing to the loosening of the rod 16 produced by the pull on the rod 6 of the servo-brake, and the pivot 13a is displaced forward (i. e. in the direction of the pedal operating mechanism) the driver feels no resistance under the pedal 12 and when the hinge point is displaced backwards the action of the rod 15 prevailing over the opposing action of the rod 16, the driver becomes aware of a sharp return of the pedal 12, so that he would lose the exact perception of the braking effect, which he obtains according to this invention through a suitable relative dimensioning of the above mentioned members.

The servo-brake serves only for forward drive. In reverse, being actuated by the transmission gear, it would have a negative effect; its action is then eliminated through the connection of the drum 1 with the transmission by an irreversible mechanism, e. g. a free wheel with pawls or rollers, or a spring tooth coupling as used in similar cases.

The type of servo-brake and the constructional details may be varied at will without departing from the scope of this invention.

What I claim is:

1. A brake operating device comprising in combination with a brake and a brake operating lever, a servo-brake in the shape of a friction brake and means for connecting said servo-brake with the operating lever and brake, so that the action of said brake on the servo-brake generates a reaction of the servo-brake on the operating lever which is directly proportional to said action.

2. A brake operating device comprising in combination with a rotatable member, a brake for said member and an operating lever for said brake, a servo-brake in the shape of a friction brake consisting of a drum rotated by the member to be braked and a braking member co-operating with said drum, connected, on one side, to the brake and, on the other side, to the operating lever, so that the action of said brake on the servo-brake generates a reaction of the servo-brake on the operating lever directly proportional to said action.

3. A brake operating device comprising in combination with a rotatable member, a brake for said member and an operating lever for said brake, a servo-brake in the shape of a friction brake consisting of a drum rotated by said member to be braked, brake shoes articulated together and co-operating with said drum and a support for said brake shoes rotatably mounted about the axis of the drum, an actuating member for said brake shoes, a swing lever, means for connecting said actuating member to one end of said swing lever, a rod for connecting the other end of said swing lever to the brake, a rod for connecting an intermediate point of said swing lever to the operating lever and a rod for connecting the hinge of the brake shoes to the brake.

4. A brake operating device comprising in combination with a rotatable member, a brake for said member and an operating lever for said brake, a servo-brake in the shape of a friction brake consisting of a drum rotated by said member to be braked, brake shoes articulated together and co-operating with said drum and a support for said brake shoes rotatably mounted about the drum axis, an actuating cam for said brake shoes, a toothed sector fast with said cam, a second toothed sector co-operating with the former and rotatably mounted about the drum axis, a lever fast with said second sector, a swing lever, one end of which is connected with said lever, the other end to the brake and an intermediate point to the operating lever and a rod for connecting the hinge of the brake shoes to the brake.

5. A brake operating device comprising in combination with a rotatable member, a brake for said member and an operating lever for said brake, a servo-brake in the shape of a friction brake consisting of a drum, a toothed wheel fast with said drum, a free wheel meshing with said toothed wheel and receiving motion from said rotatable member, brake shoes hinged together and co-operating with said drum, a support for said brake shoes rotatably mounted about the drum axis, an actuating member for said brake shoes, a swing lever, means for connecting said actuating member to one end of said swing lever, a rod for connecting the other end of said swing lever to the brake, a rod for connecting an intermediate point of said swing lever to the operating lever and a rod for connecting the hinge of the brake shoes to the brake.

6. A brake operating device comprising in combination with a rotatable member, a brake for said member and an operating lever for said brake, a servo-brake in the shape of a friction brake consisting of a drum, a toothed wheel fast with said drum, a free wheel meshing with said toothed wheel and receiving motion from said rotatable member, brake shoes hinged together and co-operating with said drum; a support for said brake shoes rotatably mounted about the drum axis, an actuating cam for said brake shoes, a toothed sector fast with said cam, a second toothed sector co-operating with the former and rotatably mounted about the drum axis, a lever fast with said second sector, a swing lever of which one end is connected to said lever, the other end to the brake and an intermediate point to the operating lever and a rod for connecting the hinge of the brake shoes to the brake.

In testimony that I claim the foregoing as my invention, I have signed my name.

VITTORIO VALLETTA.